United States Patent
Nimon et al.

(10) Patent No.: US 8,682,180 B1
(45) Date of Patent: Mar. 25, 2014

(54) INTERPOLATOR FOR HIGH-RATE OPTICAL COMMUNICATIONS

(75) Inventors: Matthew Nimon, Hinckley, OH (US); Fan Mo, Hinckley, OH (US); William Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 208 days.

(21) Appl. No.: 13/356,177

(22) Filed: Jan. 23, 2012

Related U.S. Application Data

(60) Provisional application No. 61/435,278, filed on Jan. 22, 2011.

(51) Int. Cl.
*H04B 10/00* (2013.01)

(52) U.S. Cl.
USPC .......................................... 398/202; 398/208

(58) Field of Classification Search
USPC ................................. 398/202–214
See application file for complete search history.

(56) References Cited

U.S. PATENT DOCUMENTS

| | | | |
|---|---|---|---|
| 6,687,315 B2 * | 2/2004 | Keevill et al. | 375/341 |
| 7,106,784 B2 * | 9/2006 | Eltawil et al. | 375/148 |
| 7,251,256 B1 | 7/2007 | Barry et al. | |
| 7,266,310 B1 | 9/2007 | Savory et al. | |
| 8,249,208 B2 * | 8/2012 | Dubouloz et al. | 375/355 |
| 8,270,544 B2 * | 9/2012 | Li | 375/341 |
| 8,300,758 B2 * | 10/2012 | Feller | 375/371 |
| 8,374,291 B1 * | 2/2013 | Himsoon et al. | 375/343 |
| 2004/0184487 A1 | 9/2004 | Kim | |
| 2004/0223767 A1 | 11/2004 | Pappalardo et al. | |
| 2006/0013590 A1 | 1/2006 | Hueda et al. | |
| 2007/0065078 A1 | 3/2007 | Jiang | |
| 2007/0217792 A1 | 9/2007 | Nonaka et al. | |
| 2010/0209121 A1 | 8/2010 | Tanimura | |
| 2010/0232809 A1 | 9/2010 | Cai et al. | |
| 2010/0239264 A1 | 9/2010 | Yang et al. | |
| 2010/0329677 A1 | 12/2010 | Kaneda et al. | |
| 2011/0064421 A1 | 3/2011 | Zhang et al. | |
| 2011/0179099 A1 * | 7/2011 | Hu et al. | 708/290 |
| 2011/0255878 A1 * | 10/2011 | Sage | 398/202 |
| 2012/0033965 A1 | 2/2012 | Zhang et al. | |
| 2012/0106982 A1 * | 5/2012 | Wagner et al. | 398/208 |

FOREIGN PATENT DOCUMENTS

EP 2352239 A1 8/2011

OTHER PUBLICATIONS

Non-final Office Action dated Dec. 28, 2012, U.S. Appl. No. 13/205,431 to Mo et al., 12 pgs.
International Search Report and Written Opinion dated Aug. 30, 2012, PCT/US2012/022231 to ViaSat, Inc. et al., 8 pgs.

(Continued)

*Primary Examiner* — Agustin Bello
(74) *Attorney, Agent, or Firm* — Holland & Hart LLP

(57) ABSTRACT

Methods, systems, and devices are described for a low complexity interpolator for use in optical transmission systems. An input receives a digitized version of an optical signal, and provides samples of the received signal to a filter module. The filter module filters the input samples according to a set of filter coefficients provided by a memory. The set of filter coefficients are provided based on the output of a numerically controlled oscillator that provides an output corresponding to an accumulation of partial periods of the first sample rate. Filtered data samples are output to a sample block assembler that receives the data samples, removes filtered data samples where it is indicated that the sample is not valid, and outputs valid filtered data samples at the second sample rate and at a fixed number of samples power output period.

23 Claims, 12 Drawing Sheets

(56) References Cited

OTHER PUBLICATIONS

International Search Report and Written Opinion dated Aug. 30, 2012, PCT/US2012/022234 to ViaSat, Inc. et al., 10 pgs.

International Preliminary Report on Patentability dated Aug. 1, 2013, Int'l App. No. PCT/US2012/022231 to ViaSat, Inc. et al., 5 pgs.
Non-final Office Action dated Jul. 29, 2013, U.S. Appl. No. 13/205,431 to Mo et al., 12 pgs.

* cited by examiner

INTERPOLATOR FOR HIGH-RATE OPTICAL COMMUNICATIONS

CROSS REFERENCES

The present application claims the benefit of U.S. Provisional Patent Application No. 61/435,278, filed on Jan. 22, 2011, entitled "HIGH RATE OPTICAL COMMUNICATION," which is incorporated herein by reference in its entirety.

BACKGROUND

The present disclosure relates to systems and methods for interpolation and decimation in fiber optic communications systems in general and, in particular, to low complexity interpolators for dual polarity fiber optic communications systems.

Fiber optic channels in network communications systems are well known and are considered effective for data transmission, allowing relatively high bandwidth data communication. Optical fiber used in such channels is flexible and may be bundled as cables, and is generally considered to be advantageous for long-distance communications, because light propagates through the fiber with little attenuation compared to electrical cables. Typical present day commercial optical fiber systems transmit data at 10 or 40 Gbit per second. Each fiber may carry multiple independent channels, each using a different wavelength of light in a technique known as wavelength-division multiplexing (WDM), thereby enhancing the net data rate of an optical fiber.

As more capacity is continually desired for networks, increased data transmission rates would be desirable. However, in fiber optic systems, as data rates increase the quantity of data required to be processed by demodulation and decoding components increases. Furthermore optical phenomena may introduce distortions and alterations to optical signals that result in received signals that require a significant amount of processing to properly demodulate the received signals. Given the large amounts of data transferred at high data rates and the significant amounts of processing required to demodulate the signals, demodulator architectures can become complex and costly.

SUMMARY

Methods, systems, and devices are described for a low complexity interpolator for use in optical communication systems. In one set of embodiments, an input receives a digitized version of an optical signal, and provides samples of the received signal to a filter module at a first sample rate. The filter module may filter the input samples according to a set of filter coefficients provided by a memory, and output samples at a second data rate. The set of filter coefficients may be provided based on the output of a numerically controlled oscillator. The numerically controlled oscillator may provide an output comprising an accumulation of partial periods, the partial periods corresponding to a difference between the first sample rate and the second sample rate. When the numerically controlled oscillator rolls over to a new set of accumulations, a data invalid signal may be sent, indicating that a filter output is not valid. Filtered data samples may be output to a sample block assembler that receives the data samples, removes filtered data samples where it is indicated that the sample is not valid, and outputs valid filtered data samples at the second sample rate and at a fixed number of samples per output period.

In various embodiments, a variable rate interpolation apparatus is described. The apparatus includes an input configured to receive an input channel corresponding to a digitized version of an optical signal at a first sample rate, a numerically controlled oscillator module configured to output, at a second sample rate, an accumulation of partial periods, a filter module configured to output filtered data samples at the second sample rate and a data validity indication, and a sample block assembler coupled with the filter module and configured to receive the filtered data samples, remove one or more filtered data samples based on the data validity indication, and output valid filtered data samples at the second sample rate and at a fixed number of samples per output period.

In various other embodiments, a method for variable rate interpolation in an optical signal is provided. Initially, the method may include receiving an input channel corresponding to a digitized version of an optical signal. The input channel includes a number of parallel input samples received at a first sample rate. The method may include outputting an accumulation of partial periods at a second sample rate, the accumulation of partial periods comprising an accumulation of the time difference between receipt of consecutive input samples and the outputting at the second sample rate. Filtering is performed for each of the parallel input samples based on the outputting to generate filtered input samples. A data validity indication is generated for one or more of the filtered input samples responsive to the outputting. The method may also include removing filtered input samples from a data stream including the filtered input samples responsive to the generating, and transmitting a fixed number of parallel filtered samples at the second sample rate.

BRIEF DESCRIPTION OF THE DRAWINGS

A further understanding of the nature and advantages of embodiments of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
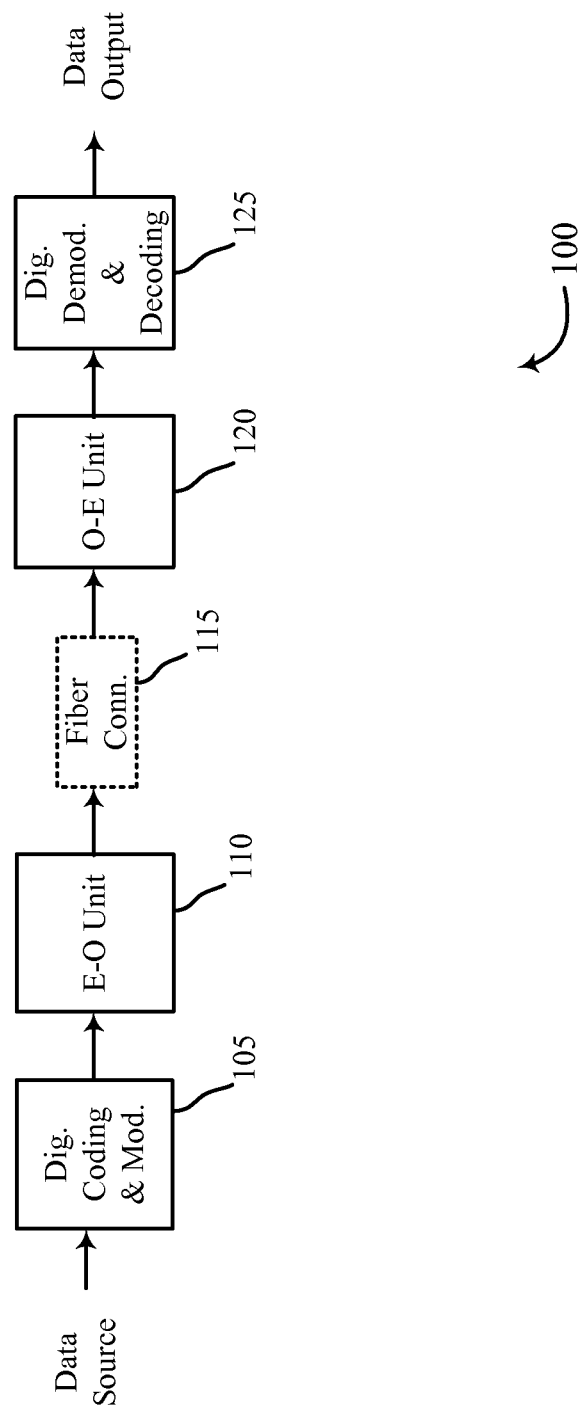
FIG. 1 is a block diagram of an optical communication system including components configured according to various embodiments of the disclosure.

Methods, systems, and devices are described for a low complexity interpolator for use in high-bandwidth optical transmission systems. In one set of examples, an input receives a digitized version of an optical signal, and provides samples of the received signal to a filter module at a first sample rate. A filter module filters the input samples according to a set of filter coefficients provided by a memory.

The set of filter coefficients may be provided from the memory based on the output of a numerically controlled oscillator. In some embodiments, the memory includes a lookup table containing sets of filter coefficients, and the output of the numerically controlled oscillator is used to determine the set of coefficients to be used from the lookup table. The output of the numerically controlled oscillator may correspond to an accumulation of partial periods. When the numerically controlled oscillator rolls over to a new set of accumulations of partial periods, a data invalid signal may be sent, indicating that the filter output is not valid.

Filtered data samples may be output at a second sample rate to a sample block assembler that receives the data samples, removes filtered data samples where it is indicated that the sample is not valid, and outputs valid filtered data samples at the second sample rate and at a fixed number of samples per output period. The sample block assembler may include a barrel shift circuit that shifts data to remove any invalid filtered samples. The output of the sample block assembler provides the fixed number of samples per output period. In the event that any filtered data samples are removed from the output because of an indication that the sample is not valid, remaining samples are shifted up and later filtered samples are provided at the end of the data stream. In the event that the samples from the sample block assembler are shifted up to the point that all samples from a particular sample period are moved up, a data invalid indication may be provided indicating that a particular fixed number of samples are not valid. This acts to provide adequate samples in the sample block assembler to allow for additional removal of invalid samples. The output of the sample block assembler, at the fixed number of samples per output period, allows downstream components of a optical signal demodulator to be designed with knowledge that the fixed number of samples will be received.

This description provides examples, and is not intended to limit the scope, applicability or configuration of embodiments of the present invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

According to various embodiments, an interpolator may be incorporated into an optical communication system that utilizes fiber optic optical cables as a data transmission medium. An example of an optical data transport system 100 is illustrated in FIG. 1. In this embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. The digital coding and modulation unit 105 receives this data, and performs framing, forward error correction coding, and modulation functions on the data. The electrical-to-optical (E-O) unit 110 transforms the data into optical signals, and transmits optical signals containing the data via a fiber connection 115. The fiber connection 115 may include well known components of such connections, including a fiber optic cable. An optical-to-electrical (O-E) unit 120 receives the optical signal from the fiber connection 115, and transforms the data into the electrical domain.

Channel conditions in the fiber connection 115 may introduce various distortions and noise into the optical signal. The digital demodulation and decoding unit 125 receives the digitized version of the optical signal and performs demodulation, forward error correction decoding, and de-framing functions on the data from the optical signal. The digital demodulation and decoding unit 125 may compensate for distortions and noise introduced into the optical signal through various filtering and other techniques. Various techniques introduced above, and as will be described in more detail below, allow for interpolation and in some cases decimation of received signals at the digital demodulation and decoding unit 125. Interpolation and decimation as described herein can be used within the demodulation and decoding unit to generate an internal data signal with known properties, which may provide for less complex design and components within the digital demodulation and decoding unit. The digital demodulation and decoding unit 125 may then output the data (e.g., to a user telecommunications device, a cable operator head-end unit, a telecommunications provider central office, a computer server, or a network attached storage system).

Figure 2:
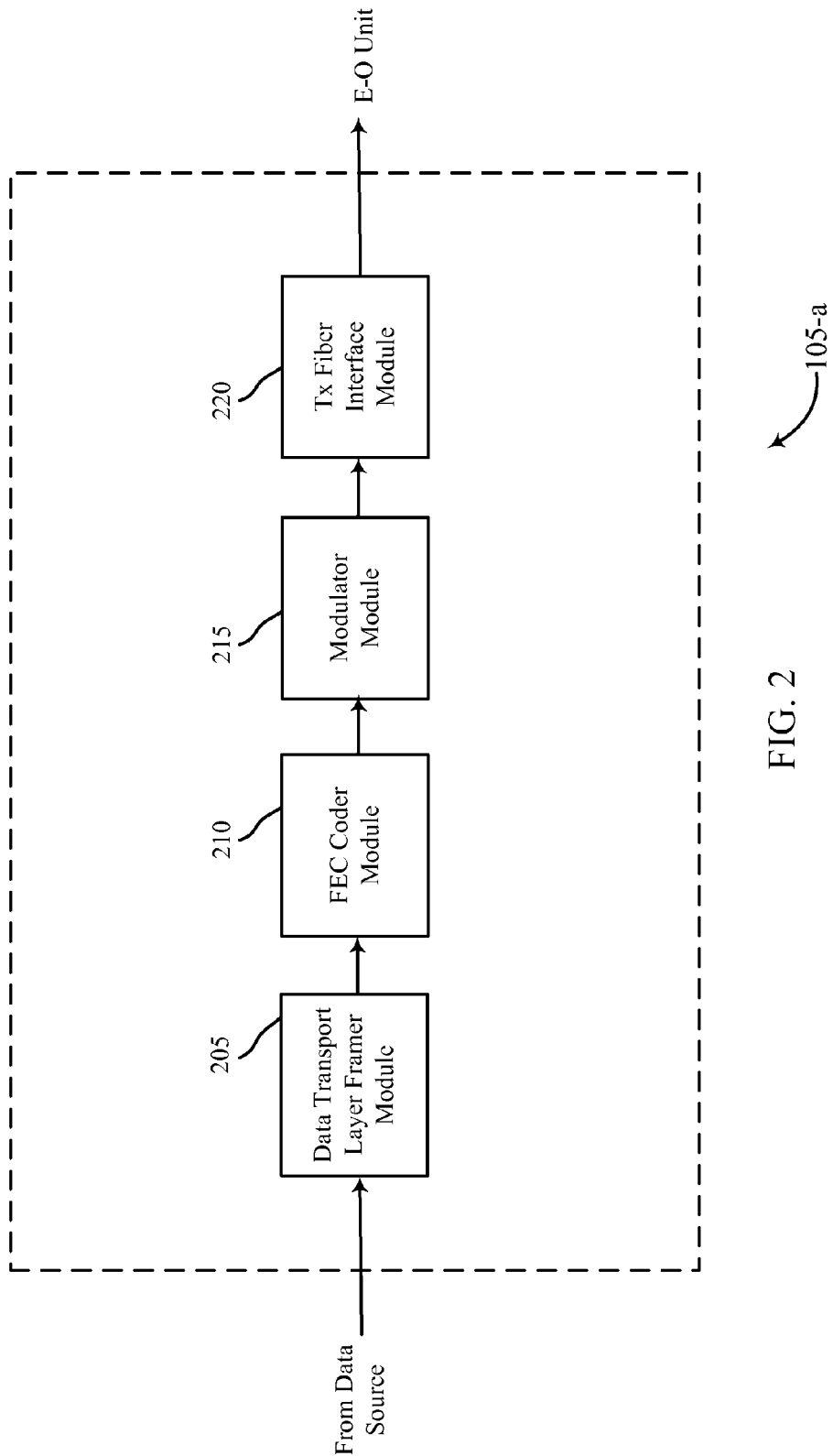
FIG. 2 is a block diagram of an electrical-to-optical unit according to various embodiments of the disclosure.

FIG. 2 illustrates an exemplary digital coding and modulation unit 105-a. In the illustrated embodiment, the digital coding and modulation unit 105-a includes a data transport layer framer module 205, an FEC coder module 210, a modulator module 215, and a transmitter fiber interface module 220. The data transport layer framer module 205 may place the data received from the data source into packet frames for transmission. The packet frames may conform to one of many common protocols for packet frames used in optical communications systems which commonly include a header and a payload, and possibly a trailer, such as a CRC. As is well understood, the header may be interleaved with the payload during transmission, depending upon the particular protocol being used for optical transmission. The FEC coder module 210 calculates and adds forward error correction (FEC) information to the frames of data received from the data transport layer framer module 205. The particular type of FEC information of various embodiments generally includes systematically generated redundant error-correcting code (ECC) data that is transmitted along with the frames. The modulator module 215 modulates the frames and FEC information, forwarding the data to a transmitter fiber interface module 220. The transmitter fiber interface module 220 may forward the modulated data to the E-O module where it may be transmitted in the optical domain via a dual-polarity (dual-pole) quadrature phase-shift-keying (QPSK) modulation, resulting in four parallel optical streams. Other modulation schemes may be used in other examples, as well.

Figure 3:
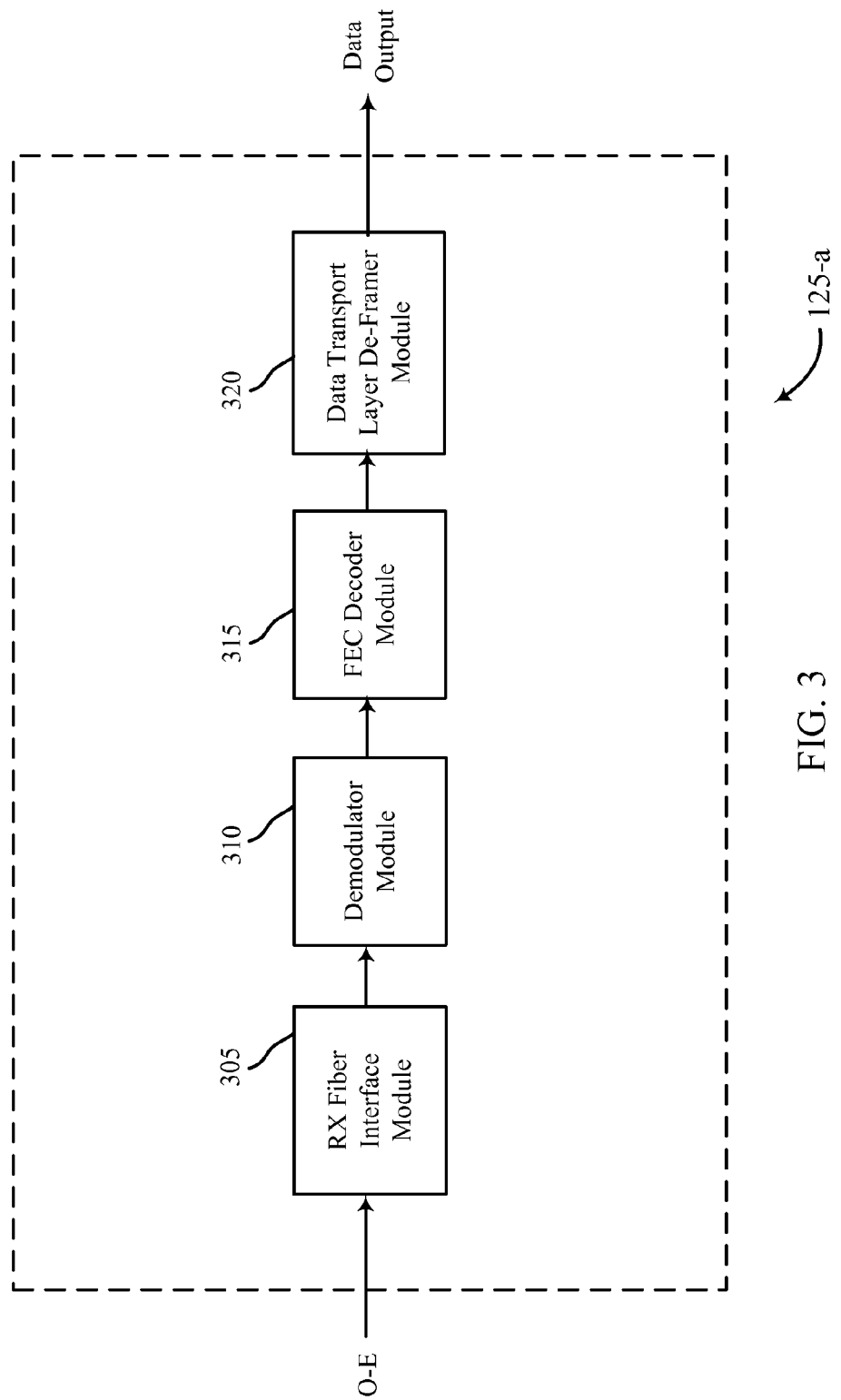
FIG. 3 is a block diagram of an optical-to-electrical unit according to various embodiments of the disclosure.

As illustrated in FIG. 3, a digital demodulation and decoding unit 125-a may include a number of modules, the complexity of which may be reduced through implementation of an interpolator/decimator such as described herein. In this embodiment the digital demodulation and decoding unit 125-a includes a receiver fiber interface module 305, a demodulator module 310, an FEC decoder module 315, and a data transport layer de-framer module 320. The receiver fiber interface 305 is the interface from the O-E unit 120. The receiver fiber interface module 305 provides electrical signals to a demodulator module 310. Various embodiments of the demodulator module 310 will be discussed in further detail below. The demodulator module 310, according to various embodiments, may receive incoming data in the form of electrical signals from the receiver fiber interface module.

The received signals may have signal characteristics that contain variations, such as timing of receipt of signal samples being slightly advanced or delayed. Such variations in received signals can result in relatively complex components being required for the demodulator module 310. In various embodiments disclosed herein, the demodulator module includes an interpolator/decimator that receives incoming data that may have various timing variations, and outputs data at a constant sample rate and with a fixed number of output samples at the sample rate. Such interpolation may allow for enhanced and efficient filtering of received signals, as will be described in more detail below. The information from the demodulator module 310 is provided to the FEC decoder module 315 which decodes and may correct transmission errors identified from error-correcting code. The FEC decoder module 315 provides decoded data to the data transport layer de-framer module 320, which de-frames the data from the signal according to the particular protocol used in the optical transmission, and provides output data. The data output may be, for example, a user or any receiving system.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

Figure 4:
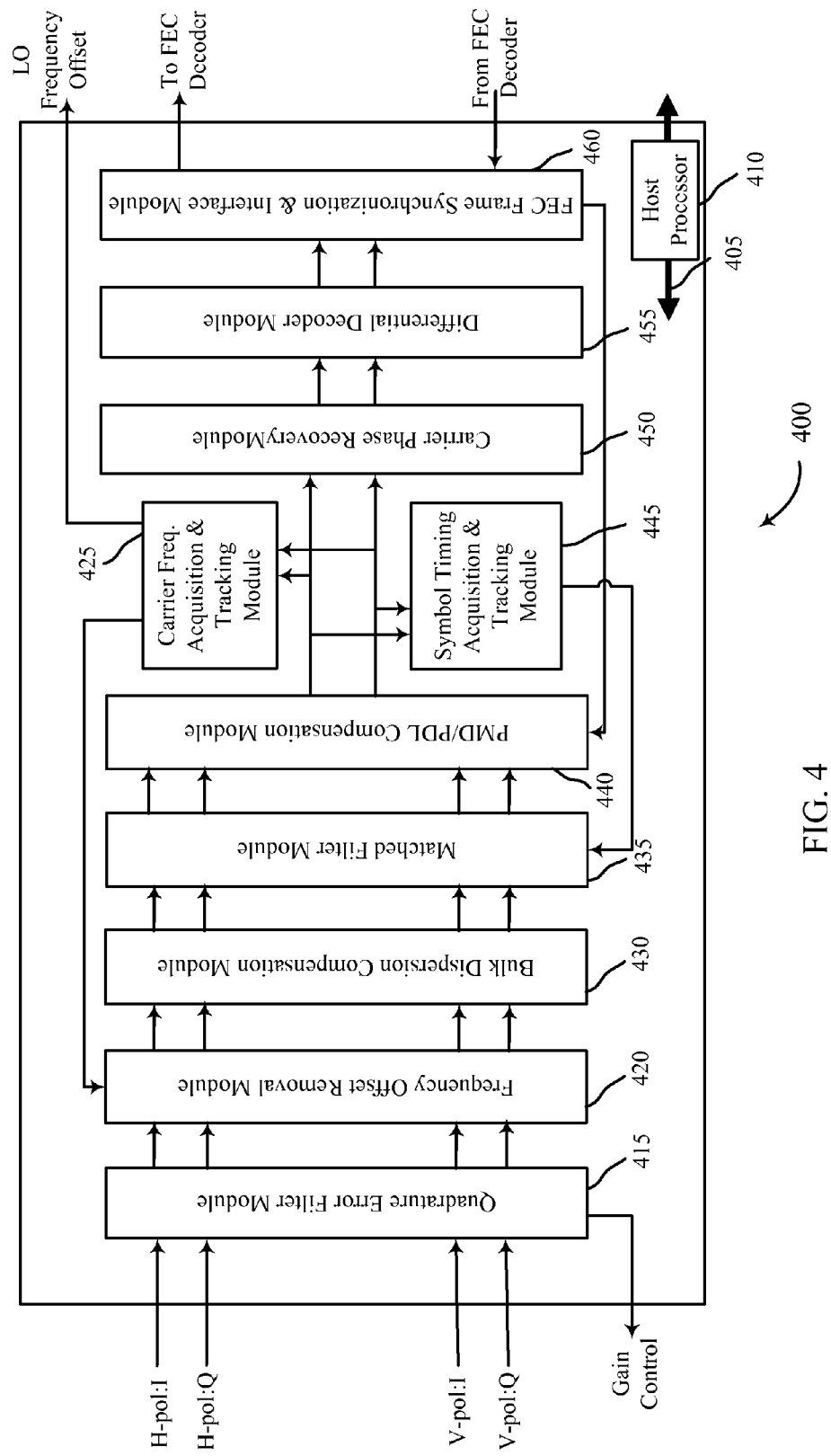
FIG. 4 is a block diagram of a demodulator unit according to various embodiments of the disclosure.

Referring now to FIG. 4, a demodulator unit 400 is described. This may be the demodulator unit 310 of FIG. 3. In this example, two polarization components are received, one horizontal component (H) and one vertical component (V). Each of the H and V components includes both an in-phase (I) component and a quadrature (Q) component. For reference, the two components in the horizontal polarization are referred to as HI (horizontal in-phase component) and HQ (horizontal quadrature component). Similarly, the two components in the vertical polarization are referred to as VI (vertical in-phase component) and VQ (vertical quadrature component). The demodulator unit 400 processes the digitized samples of the I and Q components of the two polarization components to recover the transmitted data. At the input, the demodulator unit 400 accepts the four parallel streams carrying HI, HQ, VI and VQ samples. In one embodiment, each stream contains multiple samples per clock. At its output the demodulator may provide demodulated hard-decision data (although in other examples, soft-decision data may be provided) to the FEC decoder module (e.g., FEC decoder module 315 of FIG. 3). The demodulator unit 400 may identify the beginning of an FEC frame. Additionally, in some embodiments the demodulator unit 400 receives feedback signals from the FEC decoder module 315 regarding the convergence status for error correction.

In some embodiments, the demodulator unit 400 is implemented as an application specific integrated circuit (ASIC) that includes a number of functional modules. In such embodiments, the demodulator unit 400 may have a control and monitor interface bus 405 connected to a host processor 410 allowing for configuration of demodulator parameters (filter coefficients, loop gains, etc.) and extraction of demodulator status. With continuing reference to FIG. 4, several of the sub-modules within the demodulator unit 400 of various embodiments are described. In this embodiment, a quadrature error filter (QEF) module 415 provides a collection of data formatting, error detection and correction functions. In one embodiment, input data samples are expected to be in binary-offset/offset-binary format and are converted to a two's complement (2C) format for processing within a digital signal processor. The incoming HI, HQ, VI and VQ streams, in some embodiments, also may be independently swapped and inverted if needed, allowing for any design issues that might translate into an accidental inversion or IQ swap. Each data stream of these various embodiments may be processed to remove polarization skew (between H and V poles) as well as I-Q skew within a pole. The QEF module 415 may provide for detection and removal of four types of quadrature signal errors: I/Q Skew, DC bias, I/Q amplitude imbalance, and I/Q phase imbalance. All four error detectors may be independently enabled or disabled, in some embodiments, via the processor interface, and the detected error values are output as status values via this same interface. The QEF module 415 may also output a gain control signal that may be used by other components of the system.

The QEF module 415 is connected to a frequency offset removal module 420. The frequency offset removal module 420 in one example performs a frequency rotation on the data samples coming out of the QEF module 415. The amount of frequency rotation is controlled by a frequency error input that is sourced by a carrier frequency acquisition and tracking (CFAT) module 425. Such frequency offset removal function may remove residual frequency left from the LO laser tuning in the optical domain. A bulk dispersion compensation module 430 removes bulk chromatic dispersion from the horizontal and vertical polarization channels. The compensation may be applied via a filter in the frequency domain. The amount of correction may be controlled by the chromatic dispersion filter inputs that are derived outside of the demodulator module 400 and provided via the host processor 410 and control and monitor interface bus 405, in this embodiment.

A matched filter module 435 may implement interpolation/decimation functions, for example, on data samples received from the bulk dispersion compensation module 430. The data samples received at the matched filter module 435 include a number of data samples at a first sample rate that may be higher than the baud rate, or symbol rate, of the received signal. In one example, the matched filter module 435 receives the signals at a first sample rate and filters the signals at a second sample rate that is higher than the first sample rate to provide filtered data samples at the second sample rate. The filtered data samples are assembled and a fixed number of filtered data samples are output at a constant second sample rate. The filtered data samples may include one or more invalid data samples that result from the filters requiring data that is not valid until the next clock cycle, such as when the second sample rate results in two samples of the same input sample. In one embodiment, invalid samples are removed and the assembled output includes the fixed number of valid filtered data samples. Each of the four data streams, in an embodiment, has an independent bank of FIR filters with selected coefficients. The incoming data is processed through the filter banks to produce two samples per symbol out for each data stream. The fixed number of filtered data samples provided at the second sample rate may allow for downstream components and modules to be designed to include less complex components.

One such downstream module may be PMD/PDL compensation module 440, that may utilize adaptive equalization to compensate for cross-polarization interference, IQ channel interference, adjacent symbol interference introduced by PMD and PDL in the optical channel and other residual impairments, such as residual chromatic as mentioned above. In one embodiment, an adaptive equalizer takes in data at one or two samples/symbol from the matched filter module 435 and processes the data through a bank of FIR filters with adaptive filter tap coefficients. In other embodiments, PMD/PDL compensation module 440 includes modules configured to determine filter characteristics such as a center of mass for the filter taps, and compensate for any draft in the center of mass through adjustment of the filter taps. Other embodiments may update and/or re-initialize filter taps based on characteristics of the signals output from the filter, such as timing offset information and signal identification information.

In some embodiments, a symbol timing acquisition and tracking (STAT) module 445 may estimate symbol timing using an early/late symbol radius matching scheme and PI controller, and generate an error signal to correct symbol timing. This STAT module 445, in an embodiment, also has a symbol timing lock detection mechanism that outputs a symbol lock indicator. In various embodiments, there are two sets of gains for the PI controller (wide band for acquisition and narrow band for tracking). When not in timing lock, the wideband gains may be used, otherwise, the narrowband gains may be used. The STAT module 445 may perform symbol timing acquisition and tracking on a portion of the optical signal after the PMD/PDL compensation module 440 compensates for interference caused by PMD and PDL and before carrier phase recovery on the portion of the optical signal. The STAT module 445 may provide timing information to the matched filter module 435, which may use the timing information to adjust the filters of matched filter module The CFAT module 425 may be responsible for acquiring, as well as tracking, carrier frequency. Carrier frequency acquisition is achieved using one of a number of techniques, such as through fast Fourier transform (FFT) with appropriate averaging and peak frequency component detection. The CFAT module 425 may provide a frequency error input to the frequency offset removal module 420. The CFAT module 425, in some embodiments, also provides local oscillator (LO) frequency offset output that may be used with data from the FEC frame synchronization and interface module 460. A carrier phase recovery (CPR) module 450 may use a feed-forward algorithm with a block phase estimator and a phase rotation function to remove residual frequency and phase errors. The CPR module 450 may operate on the on-time data samples produced by the PMD compensation module. A differential decoder module 455 may be responsible, in various embodiments, for accepting symbol streams from the CPR module 450 (e.g., at 1 sample per symbol). The differential decoder module 455 may be configured to differentially decode the signal and provide the decoded output (e.g., a hard-decision output data stream) to the FEC frame synchronization and interface module 460. The FEC frame synchronization and interface module 460 processes data to achieve frame synchronization, and may include three functional blocks for data alignment, frame sync detection, and clock transfer. The FEC frame synchronization and interface module 460 may be configured to skew, swap, and rotate received channels with respect to each other.

Figure 5:
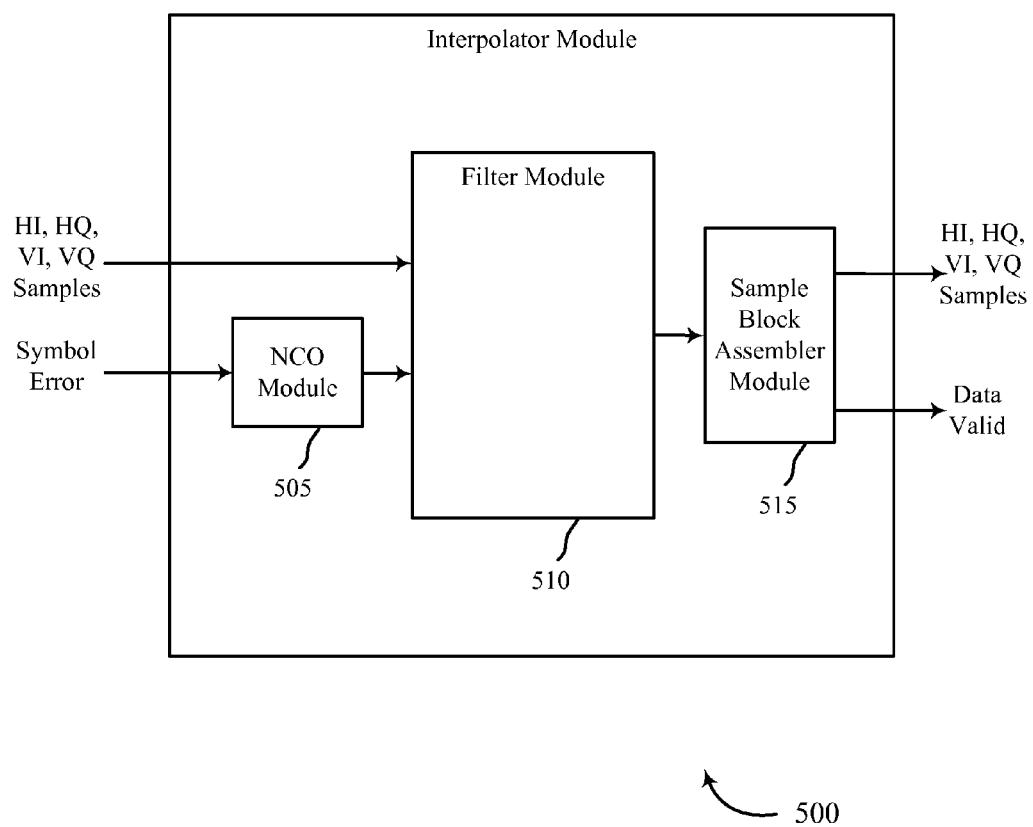
FIG. 5 is a block diagram of an interpolator/decimator module according to various embodiments of the disclosure.

With reference now to FIG. 5, a block diagram of an interpolator/decimator module 500 according to various embodiments is described. The interpolator module 500 may be included in digital demodulation and decoding module 125 of FIG. 1, demodulator module 310 of FIG. 3, or the matched filter module 435 of FIG. 4, for example. The interpolator module 500 of this embodiment includes a numerically controlled oscillator (NCO) module 505, a filter module 510, and a sample block assembler module 515. In one embodiment, input channels corresponding to a digitized version of an optical signal are received at the interpolator module 500. The input channels may include digitized versions of in-phase and quadrature signals of vertical and horizontal polarity optical signals, namely HI, HQ, VI, and VQ signals. Each input channel includes, according to various embodiments, a first number of parallel input samples received at a first sample rate.

Numerically controlled oscillator module 505 of this embodiment is configured to output, at a second sample rate greater than the first sample rate, an accumulation of partial periods of the first sample rate. Filter module 510 may be coupled with the input and the numerically controlled oscillator module. In some embodiments, the filter module 510 is configured to output, at the second sample rate, filtered data samples for each of the parallel input samples based on the output of the numerically controlled oscillator. The filter module 510 may also output a data validity indication for one or more of the filtered data samples.

Sample block assembler module 515 in the embodiment of FIG. 5 is coupled with the filter module 510 and configured to receive the filtered data samples and remove one or more filtered data samples based on the data validity indication. The sample block assembler module 515 of this embodiment then outputs valid filtered data samples at the second sample rate and at a fixed number of samples per output period. In such a manner, a variable rate input signal may be processed to provide an output signal having known characteristics.

According to one embodiment, the input data includes a pulse shaped signal with a RRC matched filter with rolloff in the range of 0.1 to 0.15. Data coming into the filter module 510 is sampled at the first sample rate. In one embodiment, data coming into the filter module 510 is sampled at approximately 1.2 times the baud rate and is input to filter module 510 at a number of parallel input samples (NPIS) per clock cycle. The clock rate can be faster than the data rate, and a symbol error signal may also be input to indicate timing errors related detected by, for example, STAT module 445 of FIG. 4. The interpolator module 500 of various embodiments interpolates the data from the input sample rate to 2.0 times the baud rate. The interpolator module 500 performs interpolation through the filter module 510 and filter coefficients applied to input data samples that are controlled by NCO module 505. The NCO module 505 may include a bank of NCOs with a fixed step size and a variable symbol timing error signal that is provided by through the symbol error signal. The range on the error signal, according to various embodiments, is around +/−1000 ppm. Of course, the range on the error signal may be any of a number of ranges, and the interpolator module 500 may accommodate such differences as will be readily recognized by one skilled in the art.

Filter module 510, in one embodiment, includes a plurality of filters, such as polyphase FIR filters, and is used to perform the interpolation. The coefficients used in the filter module 510, as mentioned above, may be determined based on the output of NCO module 505. The input HI, HQ, VI, and VQ samples are filtered, and provided to sample block assembler module 515. The sample block assembler module 515 receives filtered data samples, and removes any invalid samples, as will be described in more detail below. The sample block assembler module 515 outputs a fixed number of output samples, which may be used by downstream modules, such as PDM/PDL compensation module 440 of FIG. 4. Providing a fixed number of output samples from the interpolator/decimator module 500 provides for efficiencies in such downstream modules by providing output samples and a known sample rate and with a fixed number of samples per clock cycle. Sample block assembler module 515 in the embodiment of FIG. 5 also outputs a data valid signal that indicates when valid output data is available.

Figure 6:
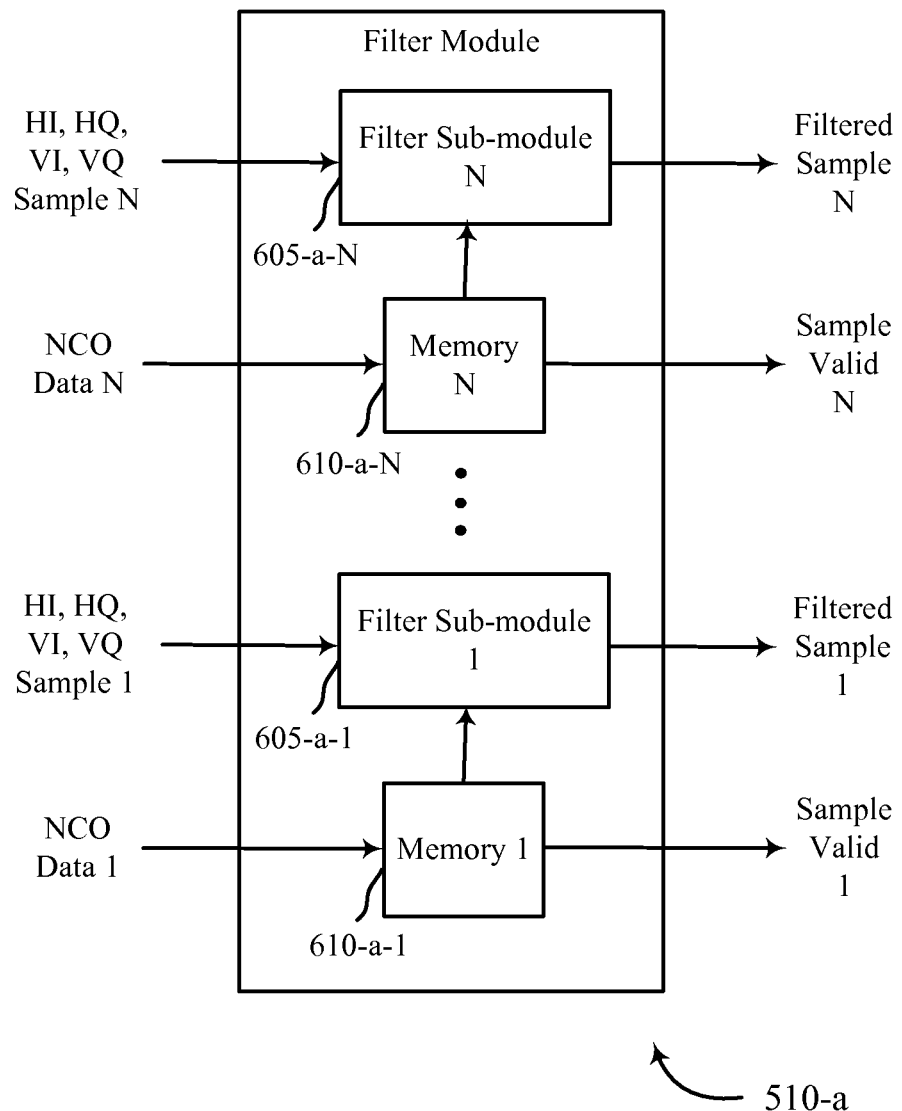
FIG. 6 is a block diagram of a filter module according to various embodiments of the disclosure.

With reference now to FIG. 6, a block diagram of a filter module 510-a is described. Filter module 510-b may be an embodiment of filter module 510 of FIG. 5, for example. In this embodiment, filter module 510-a includes a number of filter sub-modules 605-a-1 through 605-a-N. The filter sub-modules 605-a-1 through 605-a-N each receive an array of input data samples corresponding to input samples from an HI, HQ, VI, or VQ input data stream. The size of the array of input data samples, according to various embodiments, depends on the filter order for each of the filter sub-modules 605-a-1 through 605-a-N. Filter order may be set based on various design considerations, such as the available number of filter modules 605-a-1 through 605-a-N, and the number of parallel input samples per input data stream, for example. Associated with each filter sub-module 605-a-1 through 605-a-N is a corresponding memory 610-a-1 through 610-a-N. Each memory 610-a-1 through 610-a-N includes a number of sets of filter coefficients. The memories 610-a-1 through 610-a-N are coupled with NCO module, such as NCO module 505 of FIG. 5, and receive NCO data that is used to determine the set of filter coefficients to be used for a particular sample at corresponding filter sub-module 605-a-1 through 605-a-N.

In one embodiment, an upper subset of bits corresponding to a binary number output by the NCO are used as an address location for memories 610-a-1 through 610-a-N, with a set of filter coefficients stored in the memories 610-a-1 through 610-a-N at memory locations identified by the NCO output. In one embodiment, the filter sub-modules 605-a-1 through 605-a-N include polyphase FIR filters, with the output of the NCO used to select an appropriate phase for the current input data set. The rollover of the NCO provides an indicator for shifting in the next data sample into the filter sub-modules 605-a-1 through 605-a-N. The NCO provides the indicators at a second sample rate, that is different than the first sample rate. The filter sub-modules 605-a-1 through 605-a-N filter input data samples and output filtered data samples at the second sample rate. Filtered data samples from the filter sub-modules 605-a-1 through 605-a-N, similarly as described above, may be provided to a sample block assembler, such as sample block assembler 515 of FIG. 5. In some embodiments, the first sample rate is about 1.2 times the baud rate of the input samples, and the second sample rate is 2.0 times the baud rate of the input samples. Thus, in any given cycle, some of the filtered sample outputs may not contain valid data. A sample valid output (e.g., an example of a data validity indication) is provided to indicate that the particular data sample is valid or not valid. Accordingly, the output of filter module 510-a will include a variable number of valid sample outputs.

Figure 7:
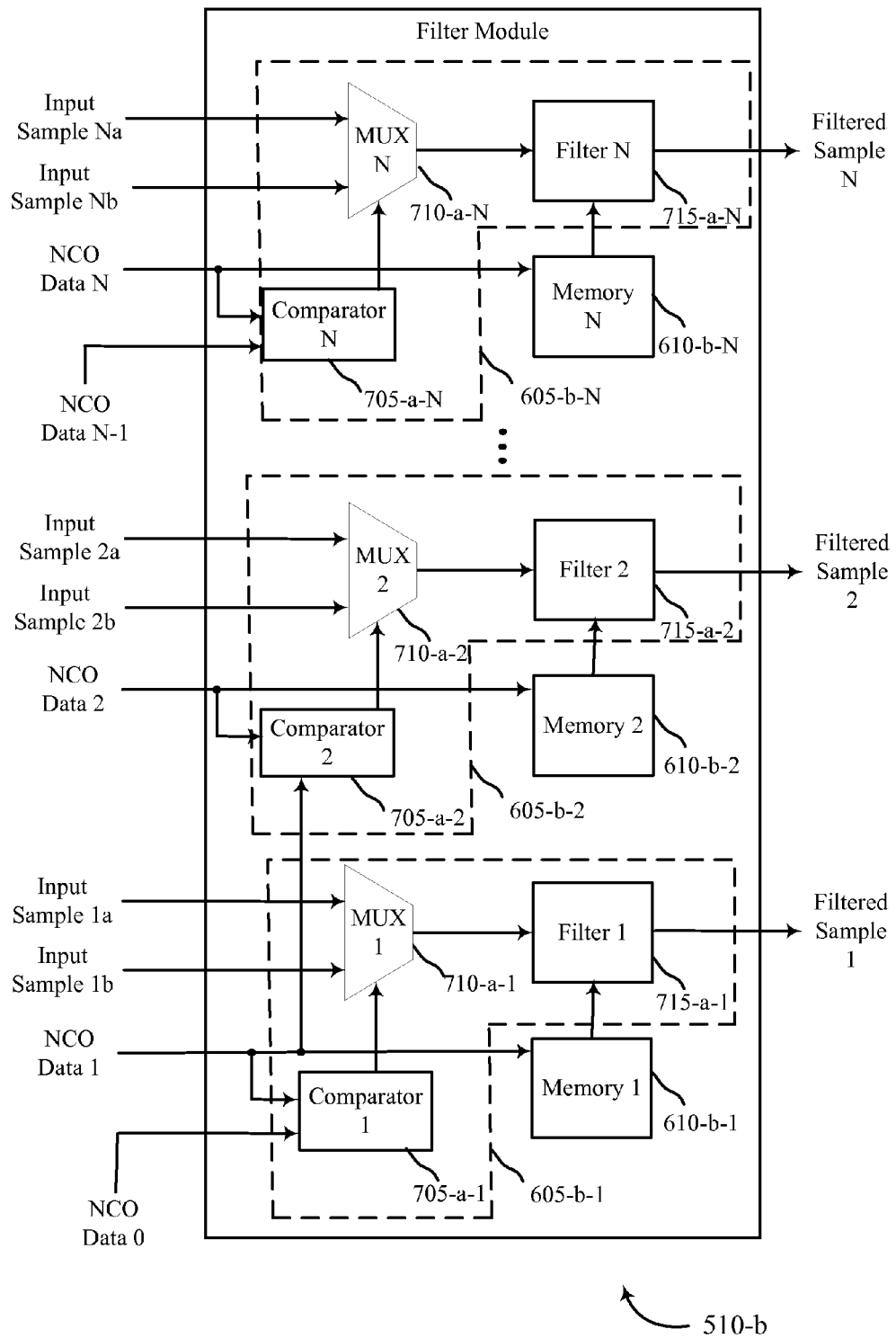
FIG. 7 is a block diagram of a filter module according to other embodiments of the disclosure.

With reference now to FIG. 7, another embodiment of a filter module 510-b is described. Filter module 510-b may be an embodiment of filter module 510 of FIG. 5 or filter module 510-a of FIG. 6, for example. In this embodiment, each filter sub-module 605-b-1 through 605-b-N includes a number of components, including comparators 705-a-1 through 705-1-N, multiplexers 710-a-1 through 710-a-N, and filters 715-a-1 through 715-a-N. In this embodiment, two input sample vectors are provided to each multiplexer 710-a-1 through 710-a-N. The multiplexers 710-a-1 through 710-a-N include a select input that is driven in this embodiment by a comparison of the output from consecutive numerically controlled oscillators performed by comparators 705-a-1 through 705-a-N. For example the input to the select input of multiplexer 710-a-1 is provided by comparator 705-a-1 that generates an output based on a comparison of NCO data 0 and NCO data 1. Similar operations are performed at filter sub-modules 610-b-2 through 610-b-N. In this embodiment, NCO negative 1 is equivalent to NCO N from the previous clock cycle. If there is an NCO rollover from the previous NCO state, multiplexers 710-a-1 through 710-a-N choose input data set "b", otherwise choose input data set "a." The data from multiplexers 710-a-1 through 710-a-N is provided to filters 715-a-1 through 715-a-N, with the coefficients for the filters 715-a-1 through 715-a-N selected from the coefficient lookup tables stored in memories 610-b-a through 610-b-N. The entry in the particular lookup table acts as an interpolation phase select for the current input data at associated filter 715-a-1 through 715-a-N.

In one embodiment, input data samples are provided at a first sample rate. The NCOs and filters 715-a-1 through 715-a-N, of this embodiment, provide NCO data and filtered data samples, respectively, at a second sample rate. Filtered data samples from the filters 715-a-1 through 715-a-N, similarly as described above, may be provided to a sample block assembler, such as sample block assembler 515 of FIG. 5. In the embodiment of FIG. 7, ranges of the first and second sample rates are selected to provide input samples with two or fewer associated NCO rollovers for any given sample. In this embodiment, two filtered data samples, at most, will have invalid output data. This number of invalid filtered data samples provides a remaining number of valid data samples that are able to be properly assembled by sample block assembler, such as sample block assembler module 515 of FIG. 5. Thus such a limitation on the first and second sample rates may be leveraged to provide a relatively low complexity interpolator/decimator. Furthermore providing the fixed number of filtered data samples at a constant sample rate allows for downstream components and modules to be of lower complexity.

Figure 8:
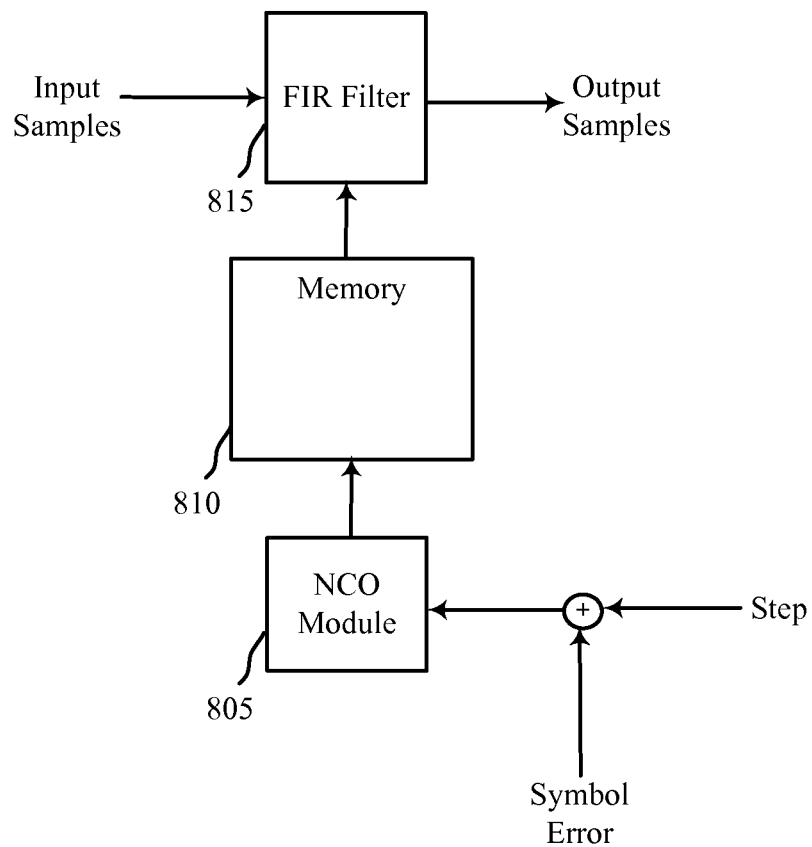
FIG. 8 is a block diagram of a interpolation/decimation circuit according to various embodiments of the disclosure.

FIG. 8 is a block diagram illustration of an interpolation and decimation circuit 800 according to various embodiments. Interpolation and decimation circuit 800 may be a component of interpolator module 500 of FIG. 5, or filter modules 510-a or 510-b of FIG. 6 or 7, respectively. In this embodiment, the interpolation and decimation circuit 800 includes a numerically controlled oscillator module 805, a memory 810, and a FIR filter 815. In this embodiment, similarly as described above, input samples are provided to FIR filter 815 at a first sample rate, and filtered output samples are output from FIR filter 815 at a second sample rate. NCO module 805 provides an output to memory 810 that determines a set of filter coefficients that are provided to FIR filter module 815. As mentioned above, input data channels may include timing errors that may be identified by, for example, STAT module 445 of FIG. 4. Such timing errors may be provided to the NCO module 815 as a symbol error signal that is added to the regular step input of the NCO module 805. This symbol error signal can further adjust the output of NCO module 805 and the resultant set of filter coefficients that are provided from memory 810 to FIR filter 815. In such a manner, identified timing errors may be at least partially compensated at the interpolator/decimator circuit 800. Output samples from the FIR filter 815, similarly as described above, may be provided to a sample block assembler, such as sample block assembler 515 of FIG. 5.

Figure 9:
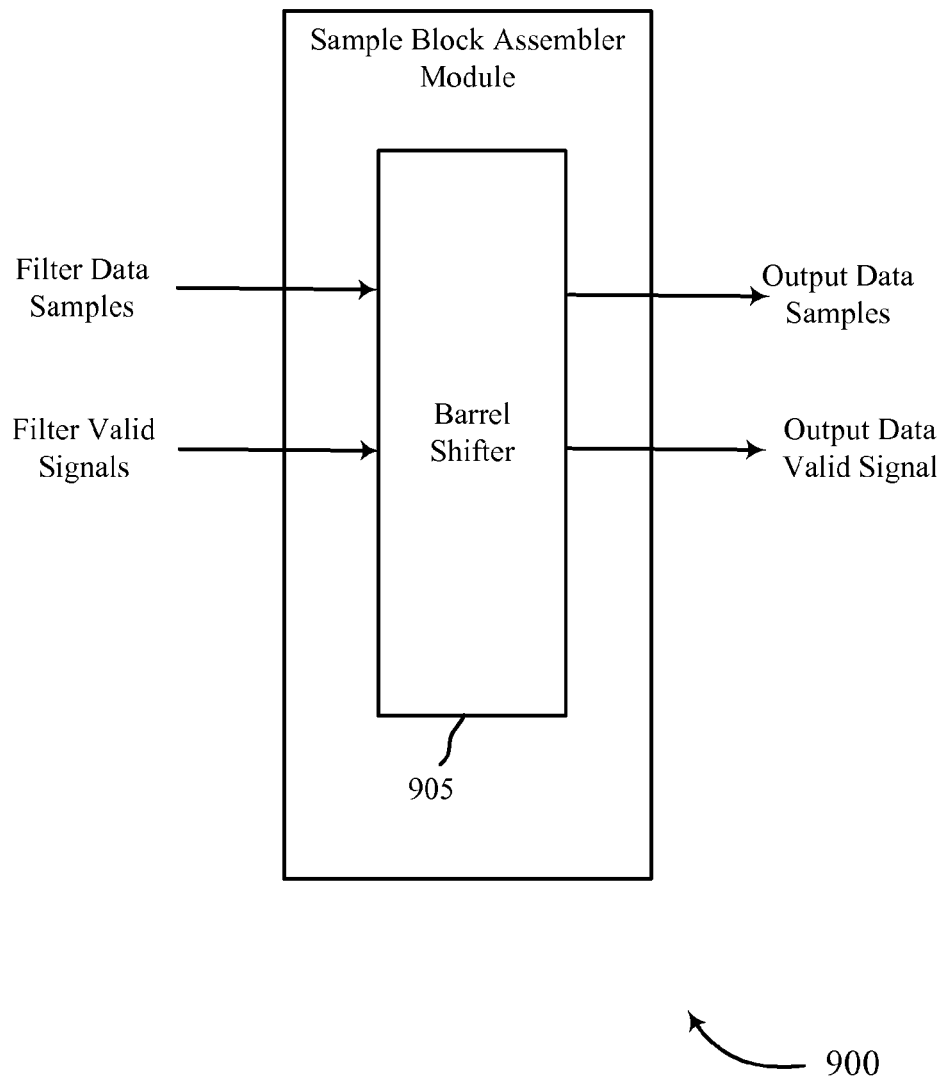
FIG. 9 is a block diagram of a sample block assembler module according to various embodiments of the disclosure.

With reference now to FIG. 9, a sample block assembler module 900 is described for an embodiment. Sample block assembler module 900 may be an embodiment of sample block assembler 515 of FIG. 5, for example. Similarly, sample block assembler module 900 may receive output of filter module 510-a of FIG. 6, filter module 510-b of FIG. 7, or FIR filter 815 of FIG. 8, for example. In this embodiment, sample block assembler module 900 includes a barrel shifter circuit 905. Barrel shifter circuit 905 of this embodiment receives filter data samples and filter valid signals. Such filter data samples and filter valid signals may be received from filter module 510-a of FIG. 6, filter module 510-b of FIG. 7, or FIR filter 815 of FIG. 8, for example.

In various embodiments, the filter data samples are provided at the second sample rate. Filter valid signals may provide an indication of data validity for certain of the filters that provide the filter data samples. An indication that data is not valid is received at barrel shifter circuit 905, which acts to remove the associated invalid filter data sample. The invalid filter data sample may be removed by shifting bits in the barrel shifter to remove the invalid filter data sample. In one embodiment, the barrel shifter 905 may shift bits to remove up to two filtered data samples provided to the sample block assembler module 900. In one embodiment, filtered data samples are shifted up in the barrel shifter 905, with samples at the end of the barrel shifter 905 provided from the subsequent number of filter data samples received at the sample block assembler module 900. Output filtered data samples are output from the sample block assembler module 900 to downstream components in the demodulator, such as PMD/PDL compensation module 440 of FIG. 4.

The sample block assembler module 900 of this embodiment also outputs an output data valid signal that indicates whether the data output from the sample block assembler module 900 is valid or invalid. Invalid output filtered data samples may result from the barrel shifter 905 advancing filter data samples from filter data samples received on a subsequent clock cycle to the top of the barrel shifter 905. In such a situation, an output data invalid signal may be generated to indicate that the output data samples for the particular clock cycle are not valid. The sample block assembler module 900 in such a case may output the same set of output data samples during a subsequent clock cycle, thus providing a one clock cycle delay in the output of the sample block assembler module 900. Such a delay may be compensated by one or more downstream components, such as PMD/PDL compensation module 440 of FIG. 4, according to various embodiments. Each data output from sample block assembler module 900 may also provide interleaved on-time and off-time samples. As mentioned above, the second sample rate may be twice the symbol rate for a system, and thus every other sample output from the sample block assembler module 900, in such embodiments, will be an on-time sample. The location of a sample within the output array can be used to indicate the on/off time samples.

Figure 10:
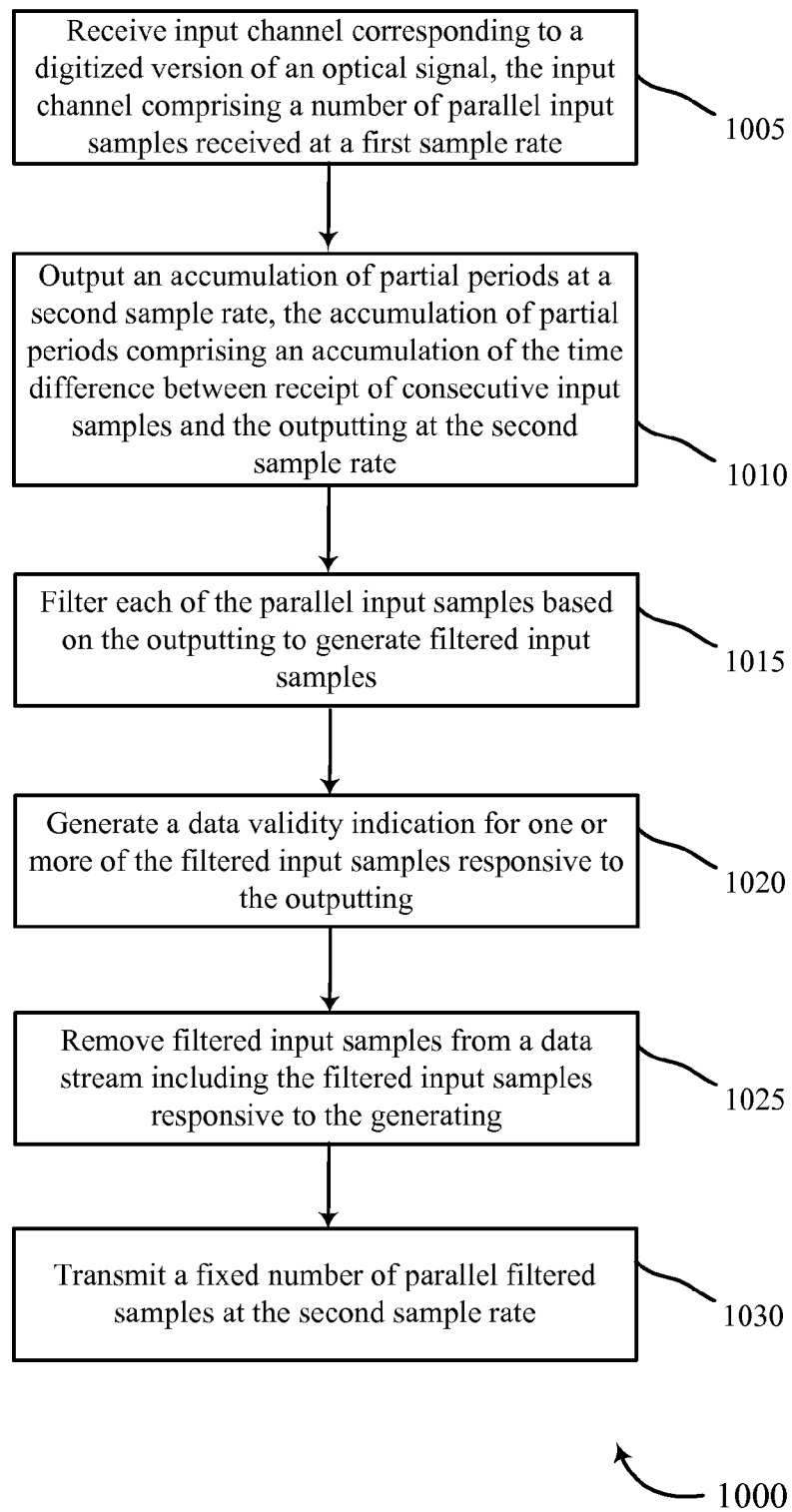
FIG. 10 is a flow chart of a method for interpolation of an optical signal according to various embodiments of the disclosure.

With reference now to FIG. 10, a flow chart diagram of the operational steps for interpolation 1000 according to an embodiment are described. The method 1000 may be performed, for example, by the digital demodulation and decoding unit 125 of FIG. 1 or 3. More specifically, the method 1000 may be performed, for example, by the demodulator unit 310, 400 of FIG. 3 or 4, respectively, or by the interpolator module 500 of FIG. 5. One or more portions of the method 1000 may be performed, for example, by filter modules 510-a or 510-b of FIG. 6 or 7, respectively, interpolator/decimator circuit 800 of FIG. 8, or sample block assembly module 900 of FIG. 9.

Initially, according to block 1005, the system receives an input channel corresponding to a digitized version of an optical signal, the input channel comprising a number of parallel input samples received at a first sample rate. The input channel, similarly as described above, may correspond to a component of an optical signal, such as a VI, VQ, HI, or HQ channel of a dual-polarity QPSK optical signal. At block 1010, an accumulation of partial periods at a second sample rate is output. The accumulation of partial periods includes an accumulation of the time difference between receipt of consecutive input samples and the outputting at the second sample rate. Such an accumulation may be provided by a numerically controlled oscillator that increments an oscillator output by a step count until the oscillator rolls over, meaning that the accumulation of partial periods has exceeded the value of a total period, and the accumulation of the time difference starts again from zero. Each of the parallel input samples are filtered based on the output of the partial periods to generate filtered input samples, as indicated at block 1015. In various embodiments, the value of the accumulation of partial periods is provided to a memory, and sets of filter coefficients are provided by the memory based on the value of the accumulation of partial periods.

A data validity indication for one or more of the filtered input samples is generated responsive to the output of the partial periods, according to block 1020. The data validity indication may indicate that the corresponding filtered data sample is a valid sample, or an invalid sample. In one embodiment, a data invalid indication is provided when a filter does not have all the data needed to complete the filtering process in the current clock cycle, which may be determined based on the output of a numerically controlled oscillator as described above, for example. Filtered input samples having a data invalid signal are removed from a data stream including the filtered input samples, as indicated at block 1025. Such samples may be removed using a barrel shifter circuit, for example. Finally, at block 1030, a fixed number of parallel filtered samples are transmitted at the second sample rate. The fixed number of samples may be used by downstream components and modules for demodulation and decoding operations associated with the received optical signal.

Figure 11:
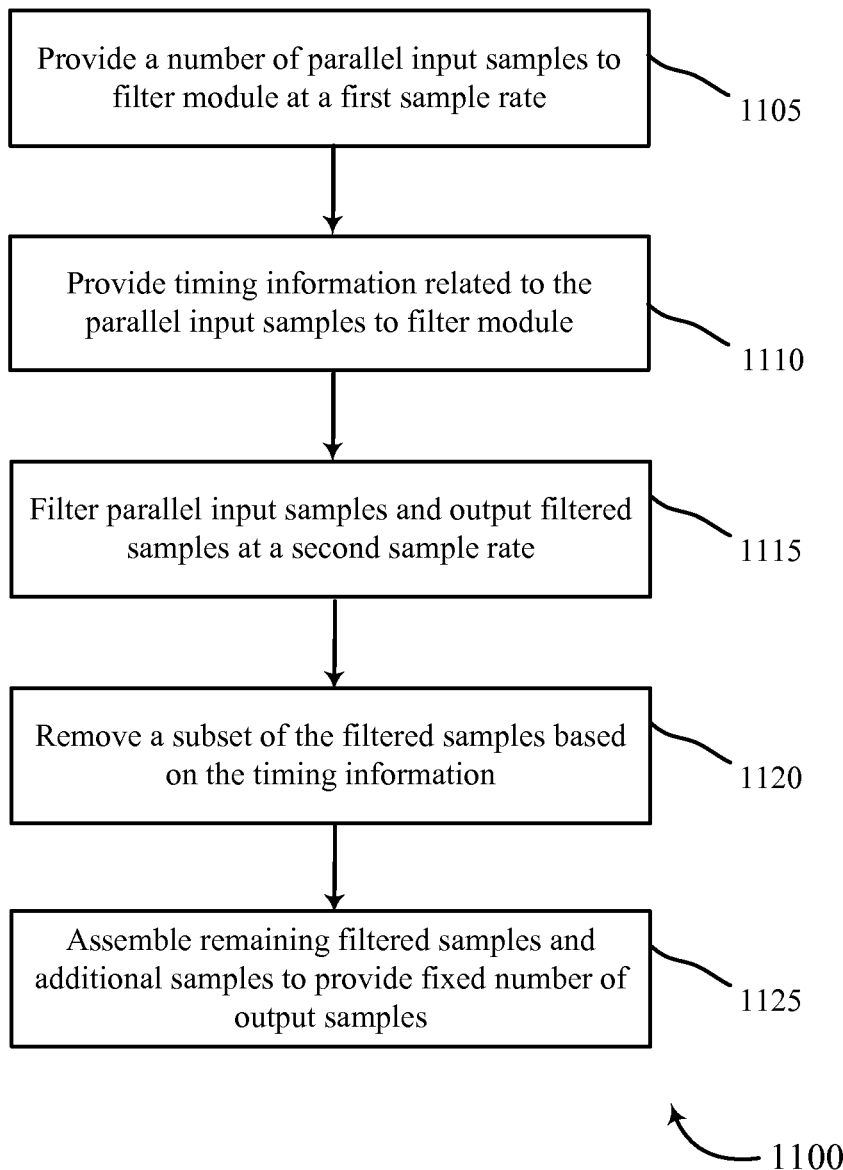
FIG. 11 is a flow chart of an alternative method for interpolation of an optical signal according to various embodiments of the disclosure.

With reference now to FIG. 11, a flow chart diagram of the operational steps for interpolation 1100 according to an embodiment are described. The method 1100 may be performed, for example, by the digital demodulation and decoding unit 125 of FIG. 1 or 3. More specifically, the method 1100 may be performed, for example, by the demodulator unit 310, 400 of FIG. 3 or 4, respectively, or by the interpolator module 500 of FIG. 5. One or more portions of the method 1100 may be performed, for example, by filter modules 510-*a* or 510-*b* of FIG. 6 or 7, respectively, interpolator/decimator circuit 800 of FIG. 8, or sample block assembly module 900 of FIG. 9.

Initially, according to block 1105, a number of parallel input samples are provided to filter module at a first sample rate. The input samples may, similarly as described above, correspond to a component of an optical signal, such as a VI, VQ, HI, or HQ channel of a dual-polarity QPSK optical signal. Timing information related to the parallel input samples to filter module are provided, according to block 1110. Such timing information may include timing error information provided by a timing error detection module, such as STAT module 445 of FIG. 4. The parallel input samples are filtered, and output filtered samples are output at a second sample rate, as noted at block 1115. A subset of the filtered samples are removed based on the timing information, as indicated at block 1120. The remaining filtered samples are assembled, along with additional samples, to provide fixed number of output samples, as noted at block 1125. Additional samples may be provided from input data samples of a subsequent clock cycle of the system.

Figure 12:
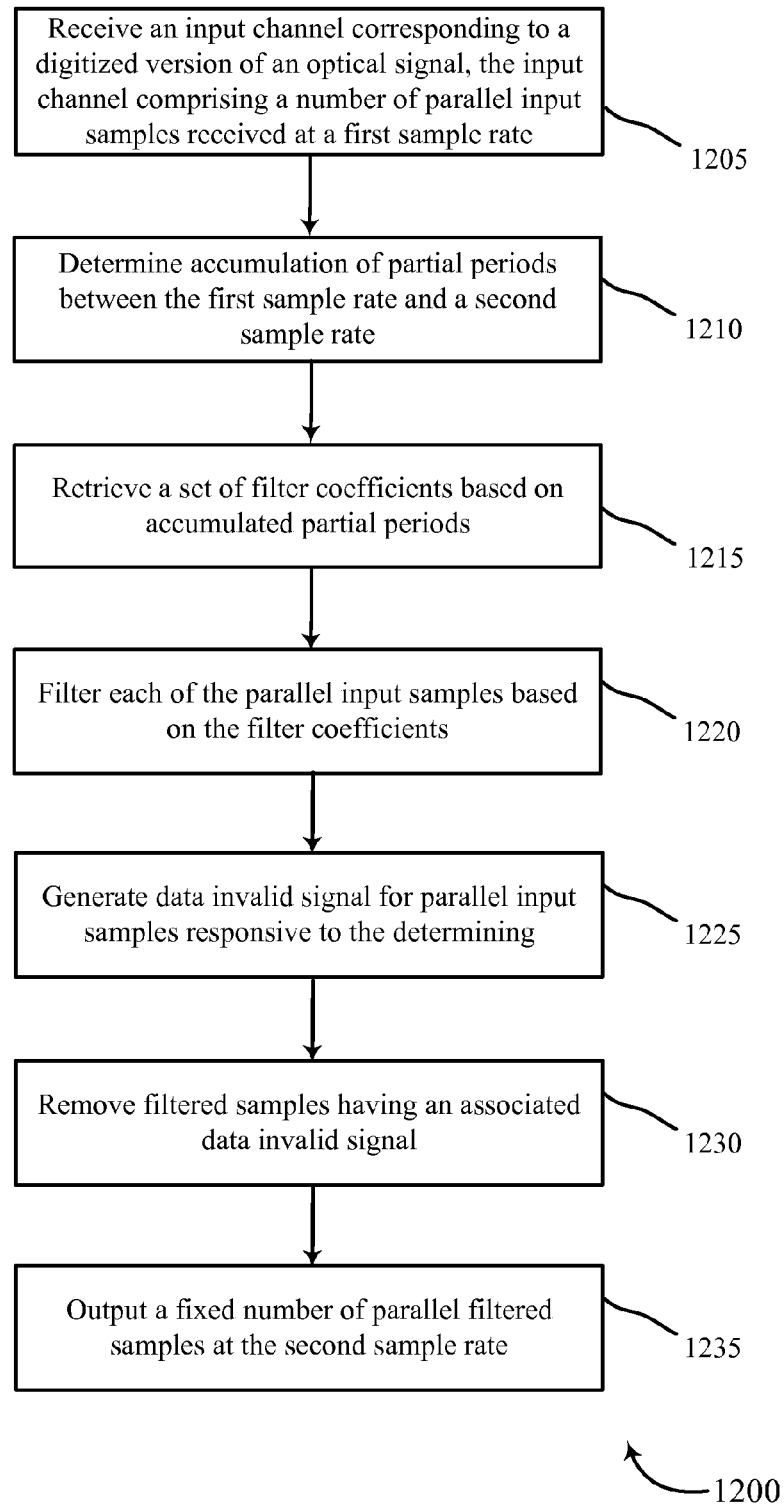
FIG. 12 is a flow chart of an alternative method for interpolation of an optical signal according to various other embodiments of the disclosure.

With reference now to FIG. 12, a flow chart diagram of the operational steps for interpolation 1200 according to an embodiment are described. The method 1200 may be performed, for example, by the digital demodulation and decoding unit 125 of FIG. 1 or 3. More specifically, the method 1200 may be performed, for example, by the demodulator unit 310, 400 of FIG. 3 or 4, respectively, or by the interpolator module 500 of FIG. 5. One or more portions of the method 1200 may be performed, for example, by filter modules 510-*a* or 510-*b* of FIG. 6 or 7, respectively, interpolator/decimator circuit 800 of FIG. 8, or sample block assembly module 900 of FIG. 9.

Initially, an input channel is received, the input channel corresponding to a digitized version of an optical signal and including a number of parallel input samples received at a first sample rate, as indicated at block 1205. The input channel, similarly as described above, may correspond to a component of an optical signal, such as a VI, VQ, HI, or HQ channel of a dual-polarity QPSK optical signal. The input channel may include a number of parallel input samples received at a first sample rate. At block 1210, an accumulation of partial periods between the first sample rate and a second sample rate is determined. The accumulation may be determined by a numerically controlled oscillator, for example.

A set of filter coefficients is retrieved based on accumulated partial periods, as indicated at block 1215. In various embodiments, the value of the accumulation of partial periods is provided to a memory, and sets of filter coefficients are provided by the memory based on the value of the accumulation of partial periods. Each of the parallel input samples is filtered based on the filter coefficients, as noted at block 1220. The samples may be filtered at a FIR filter, for example. A data invalid signal is generated for parallel input samples responsive to the accumulation of partial periods, according to block 1225. An indication of data validity or invalidity may be provided based on whether a NCO associated with one or more FIR filters, for example, has rolled over or not rolled over. Filtered samples having an associated data invalid signal are removed, as indicated at block 1230. Such invalid samples may be removed through shifting subsequent data samples in a barrel shift circuit, for example. A fixed number of parallel filtered samples are output at the second sample rate, as noted at block 1235. The fixed number of samples may be used by downstream components and modules for demodulation and decoding operations associated with the received optical signal.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of embodiments of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A variable rate interpolation apparatus, comprising:
   an input configured to receive an input channel corresponding to a digitized version of an optical signal, the input channel comprising a first number of parallel input samples received at a first sample rate;
   a numerically controlled oscillator module configured to output, at a second sample rate greater than the first sample rate, an accumulation of partial periods of the first sample rate;
   a filter module coupled with the input and the numerically controlled oscillator module, configured to:
      output, at the second sample rate, filtered data samples for each of the parallel input samples based on the output of the numerically controlled oscillator; and
      output a data validity indication for one or more of the filtered data samples; and
   a sample block assembler coupled with the filter module and configured to:
      receive the filtered data samples;
      remove one or more filtered data samples based on the data validity indication; and
      output valid filtered data samples at the second sample rate and at a fixed number of samples per output period.

2. The apparatus of claim 1, wherein the sample block assembler comprises a barrel shift circuit configured to shift filtered data samples received from the filter module to remove filtered data samples identified as invalid based on the data validity indication.

3. The apparatus of claim 1, wherein the sample block assembler is further configured to output a sample block assembler data invalid signal based on a cumulative number of removed filtered data samples.

4. The apparatus of claim 1, wherein the filter module comprises:
   a plurality of memories coupled with the numerically controlled oscillator module each storing sets of filter coefficients; and
   a plurality of filters each coupled with the input and an associated memory, each of the plurality of filters configured to receive one of the parallel input samples, receive a set of filter coefficients from the associated memory, and output:
      a filtered data sample based on the set of filter coefficients, and
      the data validity indication based on the output of the numerically controlled oscillator.

5. The apparatus of claim 4, wherein the plurality of memories comprise a lookup table including a plurality of sets of filter coefficients for the associated filter.

6. The apparatus of claim 5, wherein the numerically controlled oscillator module outputs a plurality of bits representing an accumulation of partial periods corresponding to the difference between the first and second sample rates, and wherein the filter coefficients are provided according to an entry of the lookup table associated with the plurality of bits.

7. The apparatus of claim 4, wherein the filter module further comprises:
   a plurality of multiplexers coupled between the input and the plurality of filters, and coupled with the numerically controlled oscillator, each multiplexer configured to provide a parallel input sample to the associated filter when the numerically controlled oscillator has a first output condition, and provide a different input to the associated filter when the numerically controlled oscillator has a second output condition.

8. The apparatus of claim 7, wherein the first output condition corresponds to an accumulation of partial periods of the first sample rate that is less than a period of the second sample rate, and the second output condition corresponds to an accumulation of partial periods of the first sample rate that equals or exceeds the period of the second sample rate.

9. The apparatus of claim 1, wherein the numerically controlled oscillator module is further configured to receive an error signal based on a receipt time of the first number of parallel input samples and wherein the accumulation of partial periods of the first sample rate is adjusted based on the error signal.

10. The apparatus of claim 1, wherein the input is configured to receive multiple input channels corresponding to digitized versions of in-phase and quadrature channels of horizontal and vertical polarity optical signals.

11. The apparatus of claim 1, wherein the second sample rate is between about 1.0 and 2.0 times the first sample rate.

12. A method for variable rate interpolation in an optical signal, the method comprising:
   receiving an input channel corresponding to a digitized version of an optical signal, the input channel comprising a number of parallel input samples received at a first sample rate;
   outputting an accumulation of partial periods at a second sample rate, the accumulation of partial periods comprising an accumulation of the time difference between receipt of consecutive input samples and the outputting at the second sample rate;
   filtering each of the parallel input samples based on the outputting to generate filtered input samples;
   generating a data validity indication for one or more of the filtered input samples responsive to the outputting;
   removing filtered input samples from a data stream including the filtered input samples responsive to the generating; and
   transmitting a fixed number of parallel filtered samples at the second sample rate.

13. The method of claim 12, wherein removing the filtered samples comprises shifting filtered samples to remove invalid samples to provide the fixed number of parallel filtered samples.

14. The method of claim 12, further comprising:
   retrieving a set of filter coefficients responsive to the outputting, and
   wherein the filtering is based on the retrieved set of filter coefficients.

15. The method of claim 14, wherein retrieving the set of filter coefficients comprises:
   accessing a lookup table based on accumulation of partial periods between the first sample rate and a second sample rate; and
   retrieving a set of filter coefficients stored in the lookup table.

16. The method of claim 12, further comprising:
   providing a parallel input sample to the associated filter when an accumulation of partial periods of the first sample rate that is less than a period of the second sample rate; and
   providing a different input sample to the associated filter when the accumulation of partial periods of the first sample rate equals or exceeds the period of the second sample rate.

17. The method of claim 12, further comprising transmitting a data valid signal indicating the fixed number of parallel filtered samples are valid.

18. The method of claim 12, wherein outputting an accumulation of partial periods between the first sample rate and a second sample rate comprises:
- determining an accumulation of partial periods between the first sample rate and the second sample rate;
- receiving an error signal based on a difference between an actual and expected receipt time of the first number of parallel input samples;
- adjusting the accumulation of partial periods based on the error signal; and
- outputting the adjusted accumulation of partial periods.

19. The method of claim 12, wherein filtering each of the parallel input samples comprises:
- retrieving from a plurality of memories, sets of filter coefficients responsive to the outputting; and
- filtering each of the parallel input samples based on the respective set of retrieved filter coefficients.

20. The method of claim 12, wherein generating the data validity indication for one or more of the filtered input samples comprises:
- determining that the accumulation of partial periods of the first sample rate equals or exceeds the period of the second sample rate; and
- outputting the data invalid signal.

21. The method of claim 12, wherein the receiving step comprises receiving multiple input channels corresponding to digitized versions of in-phase and quadrature channels of horizontal and vertical polarity optical signals.

22. The method of claim 12, wherein the second sample rate is between about 1.0 and 2.0 times the first sample rate.

23. A variable rate interpolation apparatus, comprising:
- means for receiving an input channel corresponding to a digitized version of an optical signal, the input channel comprising a number of parallel input samples received at a first sample rate;
- means for outputting an accumulation of partial periods at a second sample rate, the accumulation of partial periods comprising an accumulation of the time difference between receipt of consecutive input samples and the outputting at the second sample rate;
- means for filtering each of the parallel input samples based on the outputting to generate filtered input samples;
- means for generating a data validity indication for one or more of the filtered input samples responsive to the means for outputting;
- means for removing filtered input samples from a data stream including the filtered input samples responsive to the means for generating; and
- means for transmitting a fixed number of parallel filtered samples at the second sample rate.

\* \* \* \* \*